United States Patent [19]

Dieckmann

[11] 4,159,261
[45] Jun. 26, 1979

[54] STABILIZATION OF VINYL HALIDE RESINS

[75] Inventor: Dale J. Dieckmann, Euclid, Ohio

[73] Assignee: Dart Industries Inc., Los Angeles, Calif.

[21] Appl. No.: 762,683

[22] Filed: Jan. 26, 1977

[51] Int. Cl.² .................. C08K 5/56; C08K 3/08; C08K 3/24

[52] U.S. Cl. ............... 260/45.75 R; 260/45.75 M; 260/23 XA; 260/42.24; 260/42.49; 260/42.54; 260/45.85 H

[58] Field of Search ............ 260/45.75 R, 45.75 M, 260/23 XA, 42.24, 42.49, 42.54, 45.85 H; 526/192, 221, 237, 234

[56] References Cited

U.S. PATENT DOCUMENTS

| 2,795,570 | 6/1957 | Fuchs et al. | 260/45.75 R |
| 2,932,590 | 4/1960 | Barrett et al. | 427/109 |
| 3,315,111 | 4/1967 | Jaff et al. | 427/66 |
| 3,523,099 | 8/1970 | Shepard et al. | 260/45.7 R |

FOREIGN PATENT DOCUMENTS

| 566531 | 7/1960 | Belgium. |
| 606800 | 7/1960 | Italy. |
| 927386 | 5/1963 | United Kingdom. |

*Primary Examiner*—V. P. Hoke
*Attorney, Agent, or Firm*—Bryant W. Brennan; Margareta LeMaire; Fred S. Valles

[57] ABSTRACT

This invention relates to the use of indium compounds as thermal stabilizers for vinyl halide resins. Very small additions of indium compounds to vinyl halide resins, with or without the inclusion of other stabilizers, have been found to contribute marked improvements in resistance to high temperature discoloration. For example, additions sufficient to provide less than 100 ppm of indium based upon the weight of said resin are particularly effective in helping to maintain original color over a longer period of time at elevated temperatures such as are encountered during hot processing and fabricating operations.

28 Claims, No Drawings

STABILIZATION OF VINYL HALIDE RESINS

BACKGROUND OF THE INVENTION

This invention relates to novel compositions for stabilizing halogenated hydrocarbon polymers against thermal degradation.

Halogen containing vinyl resins are widely marketed today, having achieved an outstanding position of prominence in the field of synthetic polymers. However, in many cases, such resins are prone to undergo thermal degradation and discoloration during customary processing steps involving elevated temperatures. Thus, such major commercial resins as those based upon homopolymers or copolymers of vinyl chloride and/or vinylidene chloride usually discolor noticeably even during normal melt processing and fluxing steps such as milling, compounding, molding, extrusion, etc.

The severity of the discoloration problem will, of course, vary from resin to resin, with the particular method of processing used and the associated temperature and thermal exposures involved. However, in order to assure saleable finished products of good color and/or clarity, it is common practice to blend with such halogen containing polymers one or more stabilizing additives which inhibit or control degradation and discoloration during processing and fabrication operations.

Over the years many different stabilizers have been introduced and considerable progress has been made in protecting halide resins against thermal degradation.

Some of the more important heat stabilizers which have been used commercially in this field are the alkali and alkaline earth metal salts of various acids or partially esterified acids, several inorganic salts and various organoderivatives of tin, lead and antimony, as well as certain non-metallic compounds such as organic phosphites, epoxy derivatives, polyols, phenolic compounds, and various compounds of sulfur and/or nitrogen. Specific prior art additives which have been used in stabilizing vinyl halide resins are described and discussed in considerable detail in many technical treatises such as the book, "The Stabilization of Polyvinyl Chloride" by F. Chevassus and R. deBroutelles (publ. 1963 by St. Martin's Press, N.Y., N.Y.).

However, in spite of the progress which has been made and the multiplicity of stabilizing additives already marketed, discoloration is still a practical problem which detracts from the realization of the full potential of halide resins. Thus, even the best stabilizers, at tolerable use levels, can only reduce or delay discoloration. Because of this, much effort has been devoted to finding combinations of stabilizers which can provide better overall peformance. Although best current practice generally involves various such multi-component stabilizer systems, a rather delicate balance is generally involved in using same so as to achieve optimized heat stabilization without encountering other problems such as physical incompatability or adverse chemical reactions within the complete resin formulation.

In view of such complications and as confirmed in recent review articles such as the one on "Heat Stabilizers" by S. D. Brilliant on pages 228-234 of "Modern Plastics Encyclopedia" 1974-75, Vol. 51, No. 10A, (publ. Oct. 1974 by McGraw-Hill Co. of N.Y., N.Y.), the selection and use of stabilizers and stabilizer system in formulating halogenated vinyl resin compounds continues to be a very difficult and empirical art. Accordingly, the search goes on for better, safer and/or more dependable stabilizer additives and systems.

The general object of this invention is to provide improved means for protecting halogen containing resins from thermally induced decomposition and discoloration. Another object is to provide new and improved stabilizing additives for such resins. A further object is to provide such additives which are highly effective in low concentrations and useful in protecting a wide variety of halogen containing resins under many different conditions.

Other objects are to provide new and improved stabilizer systems and compatible formulations, as well as vinyl halide resin compounds containing same, which retain excellent color (e.g. clarity or whiteness) during normal high temperature processing and fabrication steps.

Still other objectives and advantages of this invention will become apparent from the detailed description thereof which follows.

SUMMARY OF THE INVENTION

In accordance with the present invention, strong gains in resistance to thermal degradation and discoloration are imparted to vinyl halide resins by blending therewith a very minor amount of a compound of indium. The extreme effectiveness of indium compounds as heat stabilizing additives is readily seen in the small concentrations at which they provide protection. Thus, for most purposes the amount of indium compound should comprise only a fraction of a percent of the vinyl halide resin system, i.e. additions sufficient to provide between about 5 and about 500 parts of indium per million parts by weight of base resin. Preferably, the amount of indium compound added will be sufficient to provide between about 10 and about 200 ppm In based upon the weight of the resinous component.

Since indium compounds provide positive heat stabilizing effects at such small concentrations, they can be employed with advantage in combinations with all known types of other heat stabilizers in providing extended protection to vinyl halide resin systems. Accordingly, as will be shown in the detailed descriptions which follow, the present invention comprises many different facets and embodiments, including: (1) proprietary forms of indium compounds which are especially compatible with vinyl halide resins, (2) performulate stabilizer compositions comprising particular combinations of indium compounds with other recognized heat stabilizers and (3) vinyl halide resin admixtures containing indium compounds (with or without various complementary adjuvants including other additives contributing to heat stability per se.).

DETAILED DESCRIPTION

The stabilizing compositions of the present invention are suitable for use with vinyl halide resins of all types and grades. Of greatest interest are those based upon polymers having chlorine atoms bonded to carbon atoms in the molecular chains. These polymers may be homopolymers such as polyvinyl chloride or polyvinylidene chloride or copolymers such as are formed by copolymerization of vinyl chloride and vinylidene chloride or either of same with other ethylenically unsaturated comonomers. For example, suitable comonomers may include olefinic hydrocarbons (such as ethylene or propylene), vinyl esters (such as vinyl acetate), acrylates (such as acrylonitrile, acrylic acid or methyl methacrylate), other vinyl monomers (such as styrene or vinyl ethers), and unsaturated polybasic acids and derivatives thereof (such as maleic acid and its esters).

Whatever polymers are to be used in making up such resin components, they can be produced by any of the accepted methods of polymerization known to the art, including bulk, emulsion, solution or suspension polymerization techniques. Polymers and/or copolymers which have been chlorinated after polymerization are also suitable, including chlorinated polyethylene, chlorinated polypropylene and post-chlorinated vinyl chloride polymers and copolymers.

This invention is also pertinent to all grades or forms of vinyl halide resins whether flexible, semi-rigid or rigid and wherein intended for use as plastisol pastes, coatings, blotter type resins, or as calendering, molding or extrusion compounds. Many of these vinyl halide resins comprise a blend of a principal vinyl halide polymer with a polymeric modifier. For example, impact modifiers includng ABS type polymers and other rubbery modifiers such as chlorinated polyethylene and various graft copolymers having a rubbery substrate may be added to vinyl chloride polymers to improve product toughness. Other modifying ingredients which are often added to vinyl chloride type polymers include pigments, dyes, fillers, lubricants and, of course, plasticizers.

Some of the better known and more commonly used plasticizers to be noted are dioctyl phthalate, tricresyl phosphate, dibenzyl sebacate, dibutyl phthalate, di-(2-ethylbutyl) azelate, di-(2-ethylhexyl) phthalate, dioctyl sebacate, etc., as well as certain polyester compounds and chlorinated derivatives.

The indium compounds of this invention may be inorganic or organic derivatives of all types with the indium being present in any of its many possible chemically combined forms. These forms include the usual simple classical compounds such as oxides, inorganic salts, organic salts, such as soaps and other carboxylates, and various salt-like compounds normally resulting from chemical reaction between metals and weakly acidic organic compounds such as alcohols, phenols, thiols and the like. Organometallic derivatives are also known in which the indium is joined directly to carbon atoms (e.g. in alphatic or aromatic groups).

Although indium can assume the monovalent state in certain compounds, it usually displays polyvalent behavior and most commonly exists in the trivalent form. Many different hybrid compounds and complexed chemical combinations are accordingly possible. For example, various double salts and complexes are known, as well as hybrid compounds in which the indium is connected to both hydrocarbyl and acidic groups (e.g. through O or S atoms). Finally, even unconventional, complex compounds based upon coordination complexes containing chemically combined indium can be used, including for example various organo indium adducts such as etherates, complexed amines and the like.

Specific examples of representative indium compounds which are suitable for use in the present invention include the following: $In(NO_3)_3$, $In_2(SO_4)_3$, $InCl_3$, $InBr$, $In(ClO_4)_3$, $InPO_4$, $In_2(CO_3)_3$, $In(OH)_3$, $In(IO_3)_3$, indium citrate, indium oxalate, indium acetate, indium laurate, indium benzoate, indium butanolate, indium phenolate, indium oleate, indium sulfamate, indium isobutyl mercaptide, indium mercaptide of 1-thioglycerol, indium mercaptide of thiolactic acid and indium mercaptide of isooctylthioglycolate.

Various complex compounds of indium can also be used including double salts, organo substituted indium compounds, hybrid compounds and other complexed forms of indium. Typical complex compounds include the following species and types: $In(OH)F_2$, $InOCl$, $Na_2InS$, $InCl_3 \cdot NH_3$, $In(NH_4)_2(SO_4)_2 \cdot 12H_2O$, $CH_3In(OH)_2$, $(CH_3)_3In \cdot O(CH_3)_2$, $(C_2H_5)_3In$, $(CH_3)_3In \cdot N(CH_3)_3$, $(NH_4)_2InCl_5 \cdot H_2O$, $Rb_2InCl_5 \cdot H_2O$, $Co(NH_3)_6InCl_6$, triphenylindine, diphenylbromoindine and other complexes or adducts of organoindium compounds with various phosphines, thioethers, amines and the like.

Although any of the above types or examples of indium compounds or mixtures thereof are useful herein, substances in which the indium content is mostly in the trivalent state are preferred as such materials are readily available and/or easily prepared in uniform quality, convenient to use and dependable in action. In view of the small concentrations of indium compounds which are useful herein, ease of dispersibility and incorporation into the vinyl halide resin to obtain an intimate blending therewith is, of course, a desirable attribute of the ideal indium containing additives. In this connection compounds which are readily soluble or easily dispersible in suitable liquids are obviously advantageous. In many cases, as will be illustrated in certain preferred embodiments to be described herein, a liquid or solid component of the finished vinyl halide resin formulation can be used as a carrier for the indium compound using preblending or masterbatching techniques. Among the regular components of halogenated resin formulations to be considered as potential carriers or extenders for the indium compounds of this invention, specific candidates include auxiliary stabilizers, fillers, pigments, lubricants, plasticizers and processing aids. If no other suitable component of the final formulation is available, a portion of the resin itself can be used to make a predispersed masterbatch. Also, water and/or suitable volatile organic liquids can be used as fugitive liquid carriers or solvents.

The beneficial effects of indium stabilizers can be enjoyed independently or in concert with other known vinyl halide resin heat stabilizers and stabilizer systems of all types. Thus, the stabilizing action of independently effective amounts of indium compounds is largely complementary with that of the usual vinyl halide heat stabilizers, including primary and/or secondary types. Among the more important of these known heat stabilizer additives are the following chemical types or classes:

I. Metallic compounds
   (a) Soaps and other carboxylates
   (b) Metal phenolates and alcoholates
   (c) Organotin compounds
   (d) Antimony derivatives
   (e) Inorganic compounds II. Non-metallic components
   (a) Epoxy compounds
   (b) Phosphite esters
   (c) Polyhydric alcohols and their derivatives
   (d) Phenolic compounds
   (e) Organic nitrogen compounds
   (f) Sulfur compounds In some cases, in fact, as will be illustrated in connection with the disclosure of certain preferred embodiments of this invention, the conjoint use of indium compounds with one or more of these prior art stabilizers results in greater resistance to discoloration than would be expected from the independent performances of the separate additives in the same base resin. In other words a mutually enhanced overall action is obtained of the type often referred to as a synergistic result.

Principal representatives of most of these prior art stabilizer classes are described in Chapter IV of the previously mentioned book by Chevassus and deBroutelles, which disclosures are incorporated herein by reference. In order to assure a clear understanding of the scope of the above outline of class terminology as used in defining the present invention, the following elaborating remarks apply.

Ia—Soaps and other metal carboxylates

In addition to the alkali and alkaline earth metals, cadmium, lead and tin are important cations and zinc and aluminum are sometimes employed. Important carboxylic acids, other than the fatty acids, include lower aliphatic acids and aromatic acids including diacids and other polyfunctional types. Irregular or hybrid carboxylates are also known including mixed metal salts, basic metal salts, partially esterified salts of polyfunctional acids and thiocarboxylates.

Ib—Metal phenolates and alcoholates

As indicated, these compounds are derived from alcohols or phenols by replacement of a hydrogen atom in a hydroxyl group by a metal. The metals from which these compounds have been derived include most of the Group II and Group IV metals (e.g., see pp. 128 and 129 of the book by Chevassus and deBroutelles). Mixed, hybrid, or complex derivatives are again possible due to the general use of polyvalent metals, as well as the optional use of polyfunctional alcohols and phenols (e.g., resorcinol).

Ic—Organotin compounds

The organotin class of compounds can be broadly characterized by the generic formula: $R_nSnX_m$ wherein R may be hydrocarbon or substituted hydrocarbon, preferably aliphatic and usually containing not over 12 carbon atoms; n is an integer from 1 to 3 and preferably is 2; X is a radical chosen from the group consisting of oxygen, sulfur, alkoxy, aryloxy, carboxylate stems represented by

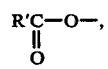

and mercaptide stems represented by R"S— where R' and R" may each be hydrocarbon or substituted hydrocarbon including the case where R' and R" are joined together; and m is equal to $(4-n) \div$ the valence of X. (This means that m should run from 1 to 3 if X is monovalent and from $\frac{1}{2}$ to 3/2 if X is divalent and will preferably equal 1 or 2 since n is preferably 2).

Representative examples of such organotin compounds include dibenzyl tin oxides, dibutyl tin oxides, dibutyl tin sulfides, dioctyl tin maleates, dibutyl tin dioctadecyloxide, monobutyl tin S-mono(isooctylthioglycolate) sulfide, dioctyl tin β-mercaptopropionate, dibutyl tin dilaurate, dibutyl tin dilauryl mercaptide, dibutyl tin S,S' bis(isooctylthioglycolate), triphenyl lauryl mercaptide and dimethyl tin laurate-maleate. Additional exemplary compounds and types of organotin compounds are plentiful in the literature such as the book by Chevassus and deBroutelles and in patents like U.S. Pat. No. 3,764,571 of Jennings et al, the disclosure of which is incorporated herein by reference.

Id—Antimony derivatives

Broadly, the antimony derivatives can be characterized by the formula: $SbX'_3$ wherein X' is defined in substantially the same way as X in Ic above. Several examples are discussed on pp. 129 and 130 of the book by Chevassus and deBroutelles. Others include antimony triphenoxide, antimony stearate, antimony S,S',S" tris(isooctylthioglycolate), n-butyl antimony diphenyl mercaptide and ditolyl antimony lauryl mercaptide.

A description of the preferred sulfur containing antimony derivatives is given in U.S. Pat. No. 3,887,508 to Dieckmann, the disclosure of which is incorporated herein by reference.

Ie—Inorganic compounds

As is by now well known and documented in the stabilizer art, these compounds are generally oxides, hydroxides or salts including sulfates, carbonates, silicates, phosphates, phosphites, sulfites, sulfides, thiocarbonates and the like. The most important metallic constituents are the alkali and alkaline earth metals of Group I and II respectively as well as cadmium, zinc, aluminum, lead and tin. Mixed salts and basic salts as well as other hybrid and complexed compounds are, of course, included. In addition to the background information on this class of compounds given in the book by Chevassus and deBroutelles, specific attention is also directed to the hybrid complexes formed by combining certain metal bases or basic metal salts with various organic compounds and commonly called "overbased" organic complexes. (See, for example, the description and discussion of same in U.S. Pat. No. 3,764,571.)

Specific examples representing the present class of compounds include sodium carbonate, barium carbonate, sodium bisulfite, potassium bicarbonate, magnesium hydroxide, tribasic lead sulfate, lead orthosilicate, dibasic lead phosphite, sodium phosphates, zinc oxide, calcium silicate and the like.

IIa—Epoxy compounds

Generally speaking any compound containing the structure

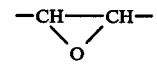

is classed as an epoxy compound. However, the use of very low molecular species is precluded by their excessive volatility under hot processing conditions of the halide resin. Accordingly, these compounds of primary interest usually have molecular weights well over 100 and preferably over 200. Among the simpler compounds of interest are glycidyl esters of fatty acids (e.g. glycidyl stearate) and glycidyl ethers of alcohols, glycols, phenols and the like (e.g. the glycidyl ethers of glycerine, resorcinol or bisphenol A). Early stage polymeric forms of such compounds are also of interest, e.g. up to average molecular weights of about 2500. The ease of epoxidation of unsaturated hydrocarbon structures by oxidizing agents such as hydrogen peroxide and peracetic acid has led to the availability of a wide variety of useful epoxy type stabilizers. Thus, as mentioned on page 134 of the book by Chevassus and deBroutelles, epoxidized natural glycerides such as soya bean oil are obtained in this way. Similar epoxidized products include linseed oil, tall oil, and other epoxidized glycerides, fatty acids and esters whether naturally derived or synthetic. Epoxidized diolefins, olefins and other polymerizable monomers such as styrene and their polymers and copolymers are also known. (See, for example, U.S. Pat. No. 2,829,135.)

IIb—Phosphite esters

These ester type derivatives of phosphorous acid are represented by the general formula:

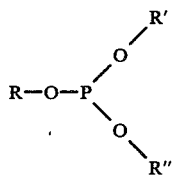

wherein R is a hydrocarbon radical such as aryl, alkyl, alkaryl, aralkyl and cycloaliphatic or a heterocyclic group, and R' and R" can independently be hydrogen or a radical as defined for R. If, as preferred, a full phosphite ester is used wherein all three R's are hydrocarbon, each such group will generally contain less than 25 carbon atoms and preferably about 6 to about 20 carbon atoms. Preferably the said hydrocarbon groups are alkaryl radicals, such as alkyl substituted phenyl groups. Also, in the above formula R' and R" can be linked to each other so as to comprise a bivalent radical.

Specific derivatives respresentative of the organic phosphite class of stabilizer include monophenyl phosphite, diphenyl phosphite, triphenyl phosphite, tricresyl phosphite, triisooctyl phosphite, diphenyl decyl phosphite, tri(tetrahydrofurfuryl) phospite, tri(p-nonylphenyl) phosphite, didodecyl benzyl phosphite and trilauryl trithiophosphite.

IIc—Polyhydric alcohols and their derivatives

This class consists essentially of the polyhydric aliphatic alcohols such as glycols, glycerols, pentaerythritol, etc., their partial esters such as mono esters with various fatty acids or other monocarboxylic acids and partial ethers of said polyhydric alcohols including those formed by condensation with other polyhydric alcohols or their own species (e.g., diglycerol or tripentaerythritol) or with monohydric alcohols such as ethanol and propanols, etc. or phenols such as cresols. Partial esters of the condensed polyhydric alcohols are also suitable.

Specific members of this general class included glycerol, diglycerol, sorbitol, glycerol monolaurate, sorbitol monooleate, trimethylol propane, pentaerythritol dicaprate, partial tall oil acid esters of triglycerol, glyceryl monophenyl ether and partial glycol ethers of pentaerythritol.

IId—Phenolic compounds

This category covers both mononuclear and polynuclear phenols, especially such hindered phenols wherein at least one of the ortho and para positions to the phenolic OH group bears a pendant hydrocarbon grouping (e.g., a tertiary butyl radical).

Specific compounds within this category include 2,6-di-t-butyl-p-cresol; 2,2' methylene-bis (4-methyl-6-t-butyl phenol); 2-t-butyl phenol; hydroquinone monobenzyl ether; 2-t-butyl-4-dodecloxyphenol; 4,4'-cyclohexylidene-bis(2-cyclohexyl phenol); 2,2' thiobis(4-methyl-6-t-butyl phenol); and 3-hydroxy-4-(phenylcarbonyl) phenyl palmitate.

Although such phenolic compounds are principally considered as antioxidants, they can often be used in small amounts in the present invention as advantageous auxiliary stabilizers. Since the book by Chevassus and deBroutelles does not discuss these agents in detail, attention is directed to such patents as U.S. Pat. Nos. 3,115,465 of Orloff et al. and 3,310,587 and 3,330,804 of O'Shea for additional information.

IIe—Organic nitrogen compounds

This category comprises stabilizer compounds having one or more amino groups or groups directly derivative therefrom such as amides, imides and the like or nitrogen-containing ring structures such as indoles and thiazoles. (See pages 141-145 of the book by Chevassus and deBroutelles for an outline of such nitrogen compounds.)

Typical specific representatives of this category include diphenylamine, thiourea, diphenylurea, dicyandiamide, formoguanamine, N,N'-diphenyloxamide, succinimide, 3-amino-1,2,4-triazole and 2-phenylindole.

IIf—Sulfur compounds

Other than elemental sulfur itself, this category is essentially devoted to non-metallic organic sulfur-containing compounds not already covered in categories IIa-IIe. Primarily, these are of two main types, namely (1) compounds having an —SH group on at least one carbon atom (e.g. mercaptans and the like), and (2) compounds containing at least one —C-S-C—, —C-S-S-C— or —C-(S)$_n$-C— grouping where n is 3 or more (e.g. thioethers, thioanhydrides and organic disulfides or other polysulfides).

Specific examples of the first type include lauryl mercaptan, naphthalene-2-thiol, monothioethylene glycol, $\beta$-mercaptopropionic acid, isooctyl thioglycolate and 2-mercapto benzothiazole.

Specific examples of the second type include thiodipropionic acid, thiolauroyl anhydride, distearyl thiodipropionate, dithioglycolic acid, dilauryl dithioglycolate, diphenyl disulfide, dibenzyl disulfide, tetrathio-bis (acetic acid) and diisooctyl ester of tetrathio-bis (acetic acid).

PREFERRED EMBODIMENTS OF INVENTION

A fuller understanding of the principles of the invention and its preferred operating parameters will be obtained by studying the details of the specific illustrative working examples which follow. In these examples, the heat stabilizing performance of the stabilizer additives are tested in the usual manner by a direct comparison of the amount of discoloration caused by the conventional hot milling of typical halogenated resin formulations with and without said additives and during supplemental high temperature oven exposure of chips from the milled sheets of the respective formulations. Unless otherwise indicated in the detailed examples, the amounts of the stabilizing additives and other auxiliary ingredients is specified in parts by weight per 100 parts of the halide resin, as indicated by the use of the simple abbreviation "phr."

EXAMPLE 1

In this example, the halide resin was a polyvinyl chloride homopolymer sold under the trade name "GEON 103 EP" by B. F. Goodrich Co. An unstabilized, unpigmented and unplasticized control batch was formulated by dry blending with the GEON 103 EP resin powder as the only additives:

3 phr of Acryloid K120N (a hot processing aid sold by Rohm & Haas Co.), and 1 phr of Wax 165, a paraffin lubricant sold by H. M. Royal Inc.

A directly comparable dry-blended test batch was also prepared except for the further addition of 0.05 phr of a 20% by weight solution of indium S,S'S,S" tris-(isooctyl-thioglycolate) in butyl carbitol, an inert solvent. This indium compound was readily prepared by slowly adding a dilute aqueous solution of indium trichloride to a dilute aqueous solution of an alkali metal mercaptide of isooctyl-thioglycolate containing slightly more than the stoichiometric 3/1 ratio of isooctyl-thioglycolate to indium. (For example, 350 cc of 1 molar $InCl_3$ solution added to 720 cc of 1.5 molar sodium isooctyl-thioglycolate solution). The reaction takes place at substantially room temperature with the indium S,S',S" tris(isooctyl-thioglycolate) separating out as a substantially colorless liquid below the aqueous layer of by-product salt solution.

The respective batches of resin+additives were converted to continuous sheets of uniform composition in the conventional manner by mastication for 5 minutes on a two roll mill at 350° F. Portions of the approximately 1/16 inch thick sheets were then cut into 1 inch square test chips some of which were placed in an oven at 375° F. Test chips from both the test batch and the control batch were then removed from the oven at 5 minute intervals over a period of a half hour or more. The color development in the various chips was then rated on the following standardized numerical scale:
1—substantially clear and colorless
2—light yellow
3—yellow to light amber
4—amber or darkening at edges
5—orange or dark amber
6—reddish brown to brown
7—dark brown or dark red
8—black The resulting color ratings are summarized in Table I below to show the relative amounts of discoloration in the respective batches after given thermal exposures.

TABLE I

| Thermal History of Samples | Color Rating For: | |
|---|---|---|
| | Control | Test Batch |
| Off Mill | 4 | 3 |
| 5 mins. (oven) | 4.5 | 3 |
| 10 mins. (oven) | 5 | 3.5 |
| 15 mins. (oven) | 6 | 4 |
| 20 mins. (oven) | 7 | 4.5 |
| 25 mins. (oven) | 7.5 | 5 |
| 30 mins. (oven) | 8 | 5.5 |

The above tabulated results show that the resistance of a typical PVC resin to thermally induced discoloration can be increased by the equivalent of about 15 minutes exposure at 375° F. by incorporating therewith only 0.01 phr of indium S,S',S" tris(isooctyl-thioglycolate).

Substantially, the same improvement in heat stability of PVC resin can be obtained by using in place of the indium mercaptide in the above example an indium soap such as indium stearate in an equivalent amount based upon indium content (i.e. about 0.013 phr for indium stearate).

EXAMPLE 2

A PVC resin sold under the trade designation SM-185 by Ethyl Corp. is used as the halide resin in this example. In order to show the cooperative interaction of indium compounds with other heat stabilizers, 2 phr of dibutyl tin S,S'bis(isooctyl-thioglycolate) is included in the control batch in addition to the following ingredients:

2 phr of Acryloid K120N
8 phr of resin B18A1, an impact modifier sold by Kanegafuchi Chemical Industry Co. Ltd.
0.8 phr of Wax E, a Montan wax sold by Hoechst A.G.

The test formulation was the same as the above except for the further addition of 0.025 phr of indium S,S,' S" tris(isooctyl-thioglycolate) in the form of a dilute solution in butyl carbitol.

These batches were hot processed on a two roll mill as in Example 1 and test chips were subjected to a similar thermal exposure except that the oven temperature was 400° F. instead of 375° F. The test results based upon the same numerical color scale rating are summarized in Table II below.

TABLE II

| Thermal Exposure | Color Rating For: | |
|---|---|---|
| | Control | Test Batch |
| Off Mill | 1 | 1 |
| 5 mins. (oven) | 2 | 1 |
| 10 mins. (oven) | 2 | 1 |
| 15 mins. (oven) | 2 | 1 |
| 20 mins. (oven) | 4 | 1.5 |
| 25 mins. (oven) | 6 | 4 |
| 30 mins. (oven) | 7 | 7 |

The above results show that the addition of a very minor amount of indium compound greatly prolonged the high temperature exposure period before onset of initial discoloration of a halide resin formulation which already contained a recommended amount of a well established and widely used organotin stabilizer.

EXAMPLE 3

A typical plasticized, unpigmented recipe was used in this example, involving the addition to the PVC resin ("GEON 102" rand from B. F. Goodrich) of the following ingredients:

35 phr of dioctylphthalate
5 phr of ADMEX 710, an epoxidized soya bean oil sold by Ashland Chemical Co., and
0.5 phr of stearic acid The above mixture was hot processed into a homogeneous sheet by 5 minutes mastication on the two roll mill at 350° F. as in Example 1 and, due to its excellent plasticization, a clear colorless sheet resulted. However, upon being heated in a 375° F. oven, test chips from said sheet began to discolor after about 20 minutes.

Three more batches of this same formulation were then made and tested in the same way except with the following heat stabilizer additives being included:

Batch A—0.05 phr of indium stearate
Batch B—2 phr of SYNPRON 357, a liquid barium-cadmium stabilizer sold by Synthetic Products Div. of Dart Industries
Batch C—0.05 phr of indium stearate + 2 phr of SYNPRON 357

Evaluation of the test chips from these batches after being removed from the oven at frequent intervals over a period of about 90 minutes revealed the following results:

TABLE III

| Batch | Oven Exposure Time for Initial Discoloration | Additional Protection Provided Over Control |
|---|---|---|
| A | 40 minutes | 20 minutes |
| B | 40 minutes | 20 minutes |
| C | 70 minutes | 50 minutes |

These results indicate that 0.05 phr of indium stearate alone not only provided just as much extension in color stability as 2.0 phr of the commercial stabilizer SYN-PRON 357 alone but also interacted synergistically with the latter so that the conjoint use of the two additives provided more extended heat stability than expected from the sum total of the individual contributions from two additives separately. Still further, even three and four component synergistic stabilizer mixtures are possible by adding to the above compositions, other compatible stabilizers, e.g. phosphite esters such as didecyl phenyl phosphite.

The remaining working examples described hereinafter are all concerned with unplasticized but pigmented resins containing a uniform addition of 1 phr of titanium dioxide. In assessing the degree of color development in the test chips in these subsequent examples, the following definitions were assigned to eight levels of color represented on the numerical scale between 1 and 8:

1—clean white
2—off-white to ivory (1st visible coloration)
3—light yellow or light beige
4—orangish yellow or lt. tan or lt. pink
5—lt. buff or tan or pink
6—buff, lt. state or lt. brown or brick
7—dk buff, slate or med. brn or brick
8—brown, dk. slate or full brick red

EXAMPLE 4

In addition to the 1 phr of TiO$_2$ pigment, the following additives were blend with the same PVC resin as used in Example 1 in order to form the control batch for this example:

3 phr of AKRYLOID K120N
1 phr of calcium stearate, and
0.5 phr of dibutyl tin S,S'bis(isooctyl-thioglycolate)

Three directly comparable test batches were also prepared with the same additives plus minor additions of indium compounds as follows:

Batch D—0.025 phr of indium S,S',S"-(tris(isooctyl-thioglycolate)
Batch E—0.025 phr of indium stearate
Batch F—0.05 phr of an aqueous solution containing about 10% by weight of indium chloride (InCl$_3$)
Batch G—0.05 phr of indium hydroxide [In(OH)$_3$]

Using the same milling and oven exposures as in Example 1, the color ratings obtained (based upon the color index scale preceding this example) were as follows:

TABLE IV

| Thermal Exposure | Color Rating For: | | | | |
|---|---|---|---|---|---|
| | Control Batch | Batch D | Batch E | Batch F | Batch G |
| Off Mill | 1 | 1 | 1 | 1 | 1 |
| 5 mins. (oven) | 1 | 1 | 1 | 1 | 1 |
| 10 mins. (oven) | 2 | 1 | 1 | 1 | 1 |
| 15 mins. (oven) | 2.5 | 1 | 1 | 1 | 2 |
| 20 mins. (oven) | 3 | 2 | 2 | 2 | 2.5 |
| 25 mins. (oven) | 4 | 2.5 | 2.5 | 2.5 | 2.5 |
| 30 mins. (oven) | 5 | 3 | 3 | 3 | 3 |
| 35 mins. (oven) | 6 | 3.5 | 3.5 | 3.5 | 4 |
| 40 mins. (oven) | 6.5 | 4 | 4 | 4 | 5 |
| 45 mins. (oven) | 7 | 4.5 | 4.5 | 4.5 | 6 |
| 50 mins. (oven) | 8 | 5 | 5 | 5 | 7 |

These results not only reveal the ability of small additions of indium compounds to extend substantially the high temperature exposure period before onset of initial discoloration of vinyl halide resins containing organotins stabilizers (as already seen in Example 2) but also demonstrate in this case the further advantage of attaining same together with excellent *long term* color stability at unusually low concentrations of said organotin stabilizer.

These excellent results were largely substantiated and confirmed by repeating parts of the above example except that, instead of the dibutyl tin S,S'bis(isooctyl-thioglycolate), the the same amount of one of the following organotin compounds was used:

(1) dibutyltin sulfide,
(2) dimethyltin S,S'bis(isooctyl-thioglycolate) and
(3) monobutyltin S,S',S" tris(isooctyl-thioglycolate).

Likewise, substantially the same improvements were observed in Batch E versus the control batch when these were remade using other PVC resins such as DIAMOND 450 resin sold by Diamond Shamrock Corp. and when the amount of indium stearate additive was varied between 0.017 and 0.05 phr ( about 20 to 60 parts by wt. of In per million parts of resin).

EXAMPLE 5

In this example the performance of indium compounds in the presence of antimony compounds was studied by using DIAMOND 450 resin with the following additives in the control batch:

0.5 phr of antimony S,S'S" tris(isooctyl-thioglycolate)
2 phr of ACRYLOID K120N
1 phr of titanium dioxide, and
1 phr of calcium stearate The test formulation was the same as the above except that 0.025 phr less of antimony S,S'S" tris(isooctyl-thioglycolate) was used and 0.025 phr of indium stearate was mixed with the remaining 0.475 phr of antimony S,S',S" tris(isooctyl-thioglycolate) before being incorporated with the other ingredients. The mixing and testing procedure was as in Example 4.

Although both batches had a clean white color when sheeted off the two roll mill after 5 minutes at 350° C., the test batch chips retained this clean white color for 20 minutes in a 375° F. oven vs. only 10 minutes for the control batch.

When a mixture of 0.45 phr of antimony S,S'S" tris-(isooctyl-thioglycolate) and 0.05 phr of indium stearate was used in the same formulation in place of the 0.5 phr of said antimony compound, about the same 10 minute extension in initial color hold was obtained in a 375° F. oven and in addition the test chips removed after oven exposures of 25 to 50 minutes showed even less color development than the first test batch as shown in the following table:

TABLE 5

| Thermal Exposure | Color Rating For: | | |
|---|---|---|---|
| | Control | 1st Test Batch | 2nd Test Batch |
| 25 mins. (oven) | 3.5 | 2 | 1.5 |
| 30 mins. (oven) | 4 | 2.5 | 2 |
| 35 mins. (oven) | 4.5 | 3.5 | 3 |
| 40 mins. (oven) | 5 | 4 | 3.5 |
| 45 mins. (oven) | 6 | 4.5 | 4 |
| 50 mins. (oven) | 7 | 5 | 4.5 |

EXAMPLE 6

In this example the performance of various indium compounds with various sulfur-containing additives was studied. The initial control batch used DIAMOND 450 as the base resin with the following additives:

3 phr of ACRYLOID K120N
1 phr of $TiO_2$
2 phr of calcium stearate, and
0.5 phr of isooctyl-thioglycolate For the first test batch the 0.5 phr of isooctylthioglycolate was replaced with a mixture of 0.45 phr of isooctyl-thioglycolate and 0.05 phr of indium stearate. Using the same procedures as in Examples 4 and 5, the results were as shown in Table VI:

TABLE VI

| Exposure | Color Rating For: | |
|---|---|---|
| | Control | Test Batch |
| Off Mill | 4 | 1 |
| 5 mins. (oven) | 5 | 1 |
| 10 mins. (oven) | 6 | 2 |
| 15 mins. (oven) | 7 | 3 |
| 20 mins. (oven) | 8 | 4 |
| 30 mins. (oven) | 8 | 4.5 |
| 40 mins. (oven) | 8 | 5 |
| 50 mins. (oven) | 8 | 5.5 |

Color improvements of approximately the same rank were obtained when the above tests were repeated using first thioglycerol and then thiolauroyl anhydride in place of the isooctylthioglycolate in both the control and test batches. Also, equivalent amounts of other indium compounds (based upon indium content) produced similar color improvements in similar formulations based upon other vinyl halide resins. In fact, a mixture of 5 to 20% indium isooctyl-thioglycolate with 95 to 80% isooctyl-thioglycolate appears to provide excellent early color hold when employed at a level of about 0.5 phr.

Another very convenient and effective form in which the indium compound can be incorporated into vinyl halide formulations is as a mixed stearate. For example, a mixture of about 5% by weight indium stearate with 95% calcium stearate is particularly versatile and effective in assuring overall success in attaining maximum benefits.

It will be obvious to those skilled in the art that many substitutions of similar or analogous ingredients from the general classes disclosed herein can be made for the specific substances employed in the above examples. Also, additional ingredients and supplemental additives may be used in vinyl halide resin formulated in accordance with this invention provided they do not materially negate or detract from the superior advantages and gains in stability which characterize my discoveries. It is intended, therefore, that the scope of my invention be measured by the appended claims.

What is claimed is:

1. A heat stabilized thermoplastic resin composition comprising vinyl halide resin having uniformly incorporated therewith a minor proportion of indium in chemically combined form said proportion being sufficient to effect a significant retardation of discoloration of said composition at elevated temperatures and amount to less than about 500 parts by weight of indium per million parts of vinyl halide resin.

2. The composition of claim 1 wherein said indium is present in an inorganic compound.

3. The composition of claim 1 wherein the indium is present in amounts providing about 10 to about 200 ppm of indium by weight based upon said vinyl halide resin.

4. The composition of claim 1 wherein said indium is in the trivalent state.

5. The composition of claim 4 wherein said trivalent indium is fully in a salt, mercaptide, phenate or other salt-like linkage.

6. The composition of claim 5 wherein said indium is present in a water soluble salt.

7. The composition of claim 5 wherein said indium is present in a salt of an organic carboxylic acid.

8. The composition of claim 7 wherein said acid is aliphatic and monocarboxylic.

9. The composition of claim 5 wherein said indium is present in a mercaptide of a carboxylic thiol.

10. The composition of claim 1 wherein the vinyl halide resin is a polymer or copolymer of a chlorinated monomer.

11. The composition of claim 10 wherein said resin is primarily derived from vinyl chloride and/or vinylidene chloride.

12. A composition as defined in claim 1 which also contains a minor amount relative to said vinyl halide resin but a major amount relative to said indium of at least one stabilizer from the established classes of stabilizers already recognized to be effective stabilizers for vinyl halide resins.

13. A composition as defined in claim 12 wherein said stabilizer material belongs to one of the following recognized classes
   (A) salt type compounds including carboxylate soaps of metals such as alkali metals, alkaline earth metals, cadmium, tin and lead.
   (B) organotin compounds
   (C) antimony compunds
   (D) epoxy compounds
   (E) phosphite esters
   (F) phenolic compounds, and
   (G) non-metallic sulfur-containing compounds.

14. A composition as defined in claim 12 wherein said stabilizer material is a metal soap.

15. A composition as defined in claim 12 wherein said stabilizer material is a sulfur-containing organotin compound or antimony compound.

16. A composition as defined in claim 12 wherein said stabilizer material is a non-metallic organic compound containing sulfur.

17. A method of protecting vinyl halide resins from thermally induced discoloration which comprises distributing throughout said resins a minor proportion of indium in chemically combined form said proportion being sufficient to effect a significant retardation of discoloration of said resins at elevated temperatures and amounting to less than 500 parts by weight of indium per million parts of said vinyl halide resin.

18. The method of claim 17 wherein said distributing involves mixing an easily dispersible material containing said indium with said resins while the latter are in particulate form.

19. The method of claim 17 wherein a relatively concentrated form of said indium is predispersed in a carrier before being mixed with the bulk of said resins.

20. The method of claim 19 wherein said carrier is an inert liquid compatible with said resins.

21. The method of claim 20 wherein said liquid is a solvent for the relatively concentrated form of said indium.

22. The method of claim 18 wherein said carrier is a recognized additive commonly used in vinyl halide resins.

23. The method of claim 18 wherein said carrier belongs to one of the following recognized additive classes:
(A) Primary stabilizers
(B) Secondary stabilizers
(C) Lubricants
(D) Plasticizers
(E) Processing Aids
(F) Fillers and pigments.

24. A stabilizer composition comprising 5 to 20% by weight of indium S,S',S" tris(isooctyl-thioglycolate) and 95 to 80% isooctyl-thioglycolate.

25. A thermal discoloration inhibiting stabilizer composition for vinyl halide resins comprising a minor proportion of indium in chemically combined form in uniform admixture with a major proportion of an established thermal stabilizer generally recognized to be effective in vinyl halide resins.

26. The stabilizer composition of claim 25 wherein said indium is present as a salt of a monocarboxylic acid and said major proportion comprises alkaline earth metal soaps.

27. The stabilizer composition of claim 25 wherein said minor proportion of indium is in the form of a trimercaptide and said major proportion is composed of the free mercaptan compound corresponding to said trimercaptide.

28. The stabilizer composition of claim 25 wherein said major proportion comprises a compound of the group consisting of organotin mercaptides and antimony mercaptides.

* * * * *

UNITED STATES PATENT AND TRADEMARK OFFICE
CERTIFICATE OF CORRECTION

PATENT NO. : 4,159,261
DATED : June 26, 1979
INVENTOR(S) : Dale Jay Dieckmann

It is certified that error appears in the above-identified patent and that said Letters Patent are hereby corrected as shown below:

Column 7, line 31 - "phospite" should read --phosphite--

Column 9, line 3 - "S,SS,S" should read --S,S'S"

Column 10, line 43 - "rand" should read --brand--

Column 11, line 39 "blend" should read --blended--

Signed and Sealed this

Sixteenth Day of October 1979

[SEAL]

Attest:

RUTH C. MASON
Attesting Officer

LUTRELLE F. PARKER
Acting Commissioner of Patents and Trademarks